JOHN W. MIX.
Improvement in Pruning Shears.
119,041. Patented Sep. 19, 1871.
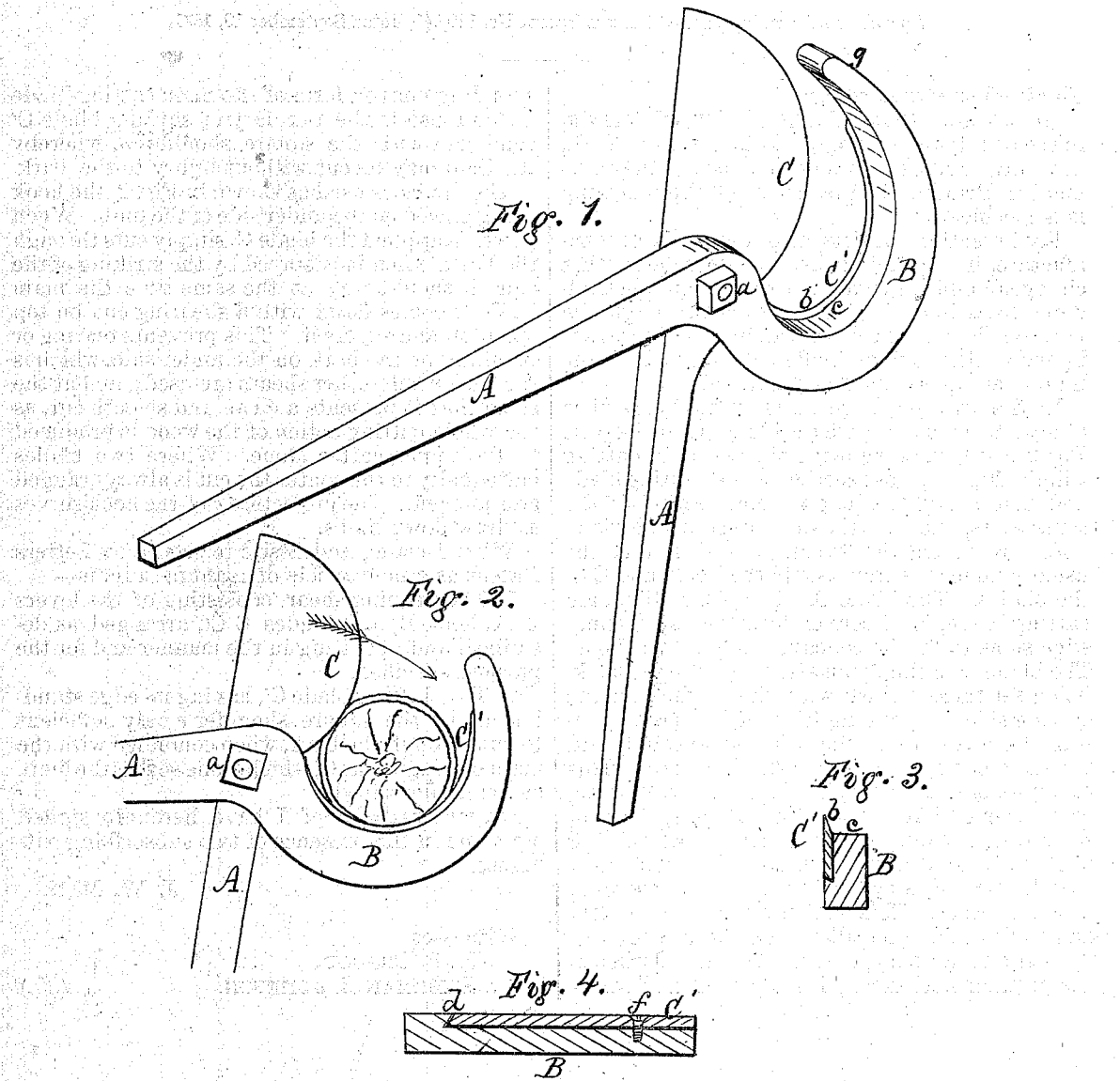

UNITED STATES PATENT OFFICE.

JOHN W. MIX, OF BATAVIA, NEW YORK.

IMPROVEMENT IN PRUNING-SHEARS.

Specification forming part of Letters Patent No. 119,041, dated September 19, 1871.

*To all whom it may concern:*

Be it known that I, JOHN W. MIX, of Batavia, in the county of Genesee and State of New York, have invented certain new and useful Improvement in Pruning-Shears, of which the following is a specification:

My invention consists, as a new article of manufacture, in a pruning-shear constructed with a changeable blade combined with a square-shouldered hook in such a way as to cut through the bark on the under side of the limb and prevent injury while the main blade cuts the body of the limb itself, as hereinafter described.

In the drawing, Figure 1 is a perspective view of my improvement with the blades thrown open; Fig. 2, a side view, showing the action in cutting a limb; Fig. 3, a cross-section of the shifting blade and hook; Fig. 4, a longitudinal section of the same parts, showing the dovetailed connection.

A A represent the levers, pivoted at *a* in the usual manner. B represents the hook, and C C' the blades. The blade C, which forms the main cutting-blade, is of convex form on its cutting-edge so as to fit the concave circle of the hook. The blade C' is simply an attachment to the hook, being set therein flush with the surface on the cutting side, and having its edge *b* projecting inward from the square face *c* of the hook only sufficient to cut through the bark of the limb. This cutting-edge may be either smooth like a knife, or roughened like a sickle, or otherwise formed, so as to cut readily into the bark. The shifting blade is secured in place in its bed in the hook by a dovetail, *d*, at one end, and a screw or screws, *f*, at the other. This makes a firm connection, and at the same time allows the blade to be readily removed for sharpening. The novelty lies in the peculiar hook-form of the part B and corresponding convex form of the main cutting-blade C; and also in the auxiliary or shifting blade C' combined with the square shoulder *a*, whereby the limb may be cut without injury to the bark.

The device is used as shown in Fig. 2, the hook being placed on the under side of the limb. When power is applied the blade C' simply cuts through the bark, when it is stayed by the striking of the square shoulder *a*; at the same time the main blade C comes down with a shearing-cut on top the limb and severs it. This prevents tearing or breaking of the bark on the under side, which is the case where other shears are used; and at the same time it presents a clean and smooth cut, as the whole cutting action of the wood is produced by the upper cutter alone. Where two blades cut equally to the center the cut is always ragged and uneven. The projection *g* of the hook serves to draw down limbs.

What I claim, and desire to secure by Letters Patent as a new article of manufacture, is—

1. The pruning-shear, consisting of the levers A A, hook B, and blades C C', arranged as described, and operating in the manner and for the purpose specified.

2. The shifting blade C', having its edge standing above the square shoulder *c* only sufficient to cut through the bark, when combined with the main cutting-blade C, which alone severs the limb, as herein described.

In witness whereof I have hereunto signed my name in the presence of two subscribing witnesses.

J. W. MIX.

Witnesses:
R. F. OSGOOD,
SHERMAN B. JOHNSON.

(30.)